(12) United States Patent
Churchill et al.

(10) Patent No.: US 8,055,673 B2
(45) Date of Patent: Nov. 8, 2011

(54) FRIENDLY SEARCH AND SOCIALLY AUGMENTED SEARCH QUERY ASSISTANCE LAYER

(75) Inventors: Elizabeth F. Churchill, San Francisco, CA (US); Joseph O'Sullivan, Oakland, CA (US); Anthony D. Thrall, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 430 days.

(21) Appl. No.: 12/133,673

(22) Filed: Jun. 5, 2008

(65) Prior Publication Data

US 2009/0307205 A1 Dec. 10, 2009

(51) Int. Cl.
*G06F 17/30* (2006.01)
(52) U.S. Cl. ........ 707/767; 707/733; 707/708; 707/771; 706/45
(58) Field of Classification Search .................. 707/708, 707/771, 732–734, 758, 769, 999.01, 999.107, 707/767, 733; 706/45–47
See application file for complete search history.

(56) References Cited

U.S. PATENT DOCUMENTS

| | | | | |
|---|---|---|---|---|
| 7,606,865 | B2 * | 10/2009 | Kumar et al. ................. | 709/206 |
| 7,680,770 | B1 * | 3/2010 | Buyukkokten et al. ........... | 704/9 |
| 7,698,270 | B2 * | 4/2010 | Brave et al. ................... | 707/603 |
| 7,756,806 | B1 * | 7/2010 | Heidenreich et al. ........... | 706/46 |
| 7,783,617 | B2 * | 8/2010 | Lu et al. ......................... | 707/706 |
| 7,895,625 | B1 * | 2/2011 | Bryan et al. ................... | 725/46 |

FOREIGN PATENT DOCUMENTS

WO WO-2005/036421 4/2005

OTHER PUBLICATIONS

Trailfire website at <http://trailfire.com>.
Iwayama et al., "Consulting search engines as conversation", in: IFIP TC.13 International Conference on Human-Computer Interaction, Interact'99, 1999.

* cited by examiner

*Primary Examiner* — Leslie Wong
(74) *Attorney, Agent, or Firm* — James J. DeCarlo; Greenberg Traurig, LLP

(57) ABSTRACT

Community search query technology operable to provide users with the means to collaborate on search queries and share their query results with other users in a community is disclosed. The community search query technology provides a collaborative search engine that utilizes community feedback and personal profiles. The community search query technology also includes personal task, information management, project creation, listing queries by activity categories, setting deadlines for ongoing search needs, setting up search queues, and annotation of search sessions.

13 Claims, 8 Drawing Sheets

AT&T Yahoo! Mail                                                                Welcome, xeeliz |Sign Out| Search Home Help ○ at&t | YAHOO!   Web | Images | Video | Local | Shopping | more >>
         SEARCH   [ Nearest airport Lancaster UK          ] [ Search ]  Advanced Search Search Results                         1 - 10 of about 95,200 for Nearest airport Lancaster UK - 0.34 sec  (About this page)

- Lancaster Gate Hotels London                                          SPONSOR RESULTS
  roomsnet.com/londonhotels - Hotels in Lancaster Gate London. Read Genuine Reviews & Book
  Online.                                                                   Lancaster Airport
                                                                            Find airport info & cheap airfare
- Live Search Maps: Airport Lancaster                                   deals for thousands of locations.
  Maps.Live.com - Easy to use maps & directions for your location. Live Search Maps.   www.cheapflights.com/airports 1. Bloomsbury Hotels London. The Lancaster Hotel. Russell Square, London, UK   Hotels in Lancaster, UK
   The Lancaster Hotel; Collection of Bloomsbury Hotels in London. ... Nearest Airport. 36 Rooms.   Book a hotel in Lancaster online.
   24hr reception. Laundry services. Dry cleaning. Restaurant...             Save up to 70% at Lancaster
   www.grangehotels.com/the_lancaster_hotel/index.htm - 32k - Cached        Hotels.
                                                                            www.ActiveHotels.com/Lancaster
2. information for participants ← 404
   ... nearest ... from Manchester Airport to Lancaster run every hour and take 1 ... conference,   Lancaster Airports
   you should let the UK National Agency know and a ...                  Compare airfare prices from over
   britishcouncil.org/socrates-events-lancaster-info-for-participants.htm - 29k - Cached   120 top websites and save up to
                                                                            70%
3. Map and Directions to Lancaster House Hotel, Lancaster, England, UK  Flights.SideStep.com
   With its open fire and Minstrel's Gallery, Lancaster ... Lancaster is the nearest railway station
   and Manchester International is the closest airport. ...              Airport Lancaster
   www.elh.co.uk/hotels/lancaster/map.htm - 10k - Cached                    Find and Compare prices on airport
                                                                            lancaster at Smarter.com.
4. Royal Lancaster Hotel London United Kingdom Hotels By ABAhotels.com  www.smarter.com
   UK. USA. More.. :: UNITED KINGDOM. Royal Lancaster Hotel ... Lancaster Terrace London
   W2 2ty England. Centrally located. 30km to the nearest airport: LHR.   Hotels near Lancaster
   www.abahotels.com/london/royal_lancaster/hotel.htm - 48k - Cached         Find Low Rates at Top Rated
                                                                            Hotels. Compare Hotel Photos-
5. 2nd MINEMA Workshop Lancaster UK November 2004                            Book Online.
                                                                            www.CompareDiscountHotels.com

○ at&t | YAHOO! SEARCH   Web | Images | Video | Local | Shopping | more >>

[cottage rent northumberland] [Search] Advanced Search

Search Results   1 - 10 of about 205,000 for cottage rent northumberland - 0.29 sec (About this page)

Yahoo!s: Report bad results or ads. Bucket test: F941          SPONSOR RESULTS 502
1. Seahouses. Northumberland - Cottage for rent.             Find Homes For Sale In Your
   Find your holiday home here - vacation rentals from around the world - book direct with the owner   Area
   ...Cottage for rent in Seahouses, Northumberland ...          Extensive list of homes for all
   www.wvro.com/offer-rentals/1454/index.html - 16k - Cached           budgets. Realtors are standing by.
                                                                        www.homegain.com
2. Beach Holiday Cottage. Northumberland Coast. - Holiday Cottage ...
   Rent Boulmer Beach Holiday Cottage, Northumberland. 6 miles from Alnwick on the beautiful    See your message here...
   North ... Holiday Cottage Northumberland. Rent Holiday Cottage in ...
   www.beachholidaycottage.com - 17k - Cached 3. Cottages For Rent in Northumberland - Cottage-Breaks UK
   ...Cottages in Northumberland. Wide range of Northumberland cottages, farm houses ...
   Cottages For Rent in Northumberland. Holiday Cottage in Northumberland ...
   cottage-breaks.co.uk/Northumberland/cottage-2.htm - 18k - Cached 4. Northumberland Cottages For Rent - Cottage-Breaks UK
   Cottages For Rent in Northumberland. Wide range of Northumberland cottages, farm ...
   Cottages For Rent in Northumberland. Holiday Cottage in Northumberland ...
   cottage-breaks.co.uk/Northumberland/cottage-1.htm - 31k - Cached 5. New Brunswick Cottage for Rent on Northumberland Strait
   ...Cottage for Rent on Northumberland Strait Murray Corner N.B. NB Cottage rental ... New
   Brunswick Cottage for Rent on Northumberland Strait. Ann and Jerry Allen ...
   1-2-c.com/canada/new_brunswick_cottage_for_rent_on_northumberland_s... - 25k - Cached

AT&T Yahoo! Mail     Welcome, xeellz [Sign Out] Help

Web | Images | Video | Local | Shopping | more >>

[vienna hotels] [Search] Options ▼

○ at&t | YAHOO!
HIGH SPEED INTERNET

1 - 10 of 9,590,000 for vienna hotels (About) - 0.21 sec

SPONSOR RESULTS

Also try: luxury collection vienna hotels, austria vienna hotels, More...

- 175 Hotels in Vienna - Austria
  www.booking.com/vienna - Book now and save up to 75%. No reservation fee and pay at your hotel.

- Save up Vienna Hotels
  www.bookinhotels.com - Save up to 75% off Vienna hotels. Instant Confirmation.

Y! Hotels in Vienna, Austria - Travel Results

| Price | Hotel Class | Most Popular |
|---|---|---|
| $15 - $85 (62) | 5 Stars (17) | Radisson SAS Palais... - from $247 |
| $85 - $110 (52) | 4 Stars (94) | Hilton Vienna Danube - from $154 |
| $110 - $150 (62) | 3 Stars (72) | Hotel Imperial - from $486 |
| $150 - $660 (57) | 2 Stars (7) | Graben Hotel - from $206 |

Yahoo! Shortcut - About

Yahoo!s: Report bad results or ads. Bucket test: None

1. Vienna Hotels, Austria - Hotel Reviews & Rates - Trip/Advisor
   Vienna hotels: Visit TripAdvisor for the most unbiased, fresh traveler reviews, photos, articles, and deals regarding hotels in Vienna, Austria.
   www.tripadvisor.com/Hotels-g190454-Vienna-Hotels.html ← 604

*Friends also recommend this site* ☐☐ ← 602

2. www.booking.com - Overview of discount hotels in Vienna, Austria...

SPONSOR RESULTS

Vienna Hotel Discounts
Save up to 75% on Vienna Hotels. Pay at check-in. No booking fees.
www.priceline-europe.com

Vienna Cheap Hotels
Great Range of Cheap Vienna Hotels Low Rates, Up to 75% off Now.
www.HotelTravel.com

Hotel in Vienna VA - Tysons Corner Hotel
Official Site: Hilton Garden Inn Hotel in Tysons Corner. Book Direct.
www.HiltonGardenInn.com

Hotels and Accomodation in Vienna
Great deals on Hotels in Vienna from 1 to 5 stars. Book online.
www.viennahotels.it

Vienna Hotels
Book Hotel Rooms with Confidence. Travelocity Guarantees Low Prices.
www.Travelocity.com

*FIG. 6*

FRIENDLY SEARCH AND SOCIALLY AUGMENTED SEARCH QUERY ASSISTANCE LAYER

FIELD OF THE INVENTION

The present invention relates generally to internet communication and more particularly to internet community communication.

BACKGROUND OF THE INVENTION

Internet search algorithms such as PageRank order web pages according to how well they match a given search string. Among other methods, such algorithms compute a measure of the match to the search string based on the number of pages linked to them. Other keyword-based methods of measuring the match to the search string are based on how often the search keywords occurred in a page, or how strongly associated the search keywords are within each page.

These methods of web search are simplistic. Keyword queries provide too little data to derive user intent and ambiguities in language can cause problems. Search is therefore, from a machine's perspective, under-constrained and information poor. This problem will increase as rich media, such as video, are increasingly searched. Therefore, there is a need for systems and methods that provide a more cogent web search.

SUMMARY OF THE INVENTION

Community search query sharing technology operable to provide users (e.g., community, individuals, dyads, small and large groups) with the means to share their information search queries and query results with other users in a community is disclosed. The search query community sharing technology provides a collaborative search engine with personal task, information management, projects creation, listing queries by activity categories, setting deadlines for ongoing search needs, setting up search queues, user profile, and annotation of search sessions.

A first embodiment of the invention comprises a socially augmented search query assistance system. The system comprises logic for providing a search webpage suitable for input of a search query on a display, and the search webpage is operable to initiate an internet search. The system also comprises logic for providing a social search webpage operable to organize information related to at least one search. The system further comprises logic for providing a friend list selection on the social search webpage operable to communicate information on the search query to search friends on the friend list, receiving search recommendation responses from the search friend, and modifying the internet search based on the search recommendation responses. The system may also comprise logic for learning meta-data based on responses from the search friends, and logic for using the meta-data to improve future searches by a search algorithm.

A second embodiment of the invention comprises a socially augmented search query assistance system. The system comprises a search input interface operable to receive a search query from a user. The system further comprises a social search manager module operable to request search query suggestions from "search friends", and a search engine operable to perform an information search based on the search query and any responses from the search friends. The system may further comprise a meta-learning module operable to create meta-data based on responses of the search friends, and a search module operable to use the meta-data for future searches. The system may also include a feedback module operable to send a feedback from the user to the search friends, and an advertising server for providing advertising to the user related to the search query.

A third embodiment of the invention comprises a method for socially augmented search query assistance. The method comprises receiving a search query from a user, and receiving a selection of search friends from the user. The method further comprises providing the search query to the selection of search friends, receiving search suggestions from the selection of search friends, and providing search results based on the search suggestions. The method may also comprise modifying a search algorithm based on the search suggestions, and using the search algorithm for a search. The method may also comprise sending feedback from the user to the search friends, and providing advertising related to the search query.

A fourth embodiment of the invention comprises a computer-readable medium comprising program code for providing a socially augmented search query. The program code comprises receiving a search query from a user, and receiving a selection of search friends from the user. The program code further comprises providing the search query to the selection of search friends, receiving search recommendations from the selection of search friends, and providing search results based on the search recommendations. The program code may further comprise program code for modifying a search algorithm based on the search suggestions, and using the search algorithm for a search. The program code may also include program code for sending a feedback from the user to the search friends, and providing advertising related to the search query.

A fifth embodiment of the invention comprises an interface for providing a socially-augmented search query assistance on a webpage. The interface comprises a query area operable for input of a search query, a results area operable for presentation of search results, and an recommender area on or near each of the search results operable to present icons representing people who recommend each of the search results. The interface may also comprise a search list area for a list of current searches, an ask friends button operable to invite at least one user from a plurality of users to participate in a search, a user area for presenting a list of users, a user icon area for presenting a list of users in the form of a list of icons, a timeframe area operable for inputting a timeframe for the search query, a request area operable for requesting a list of search projects, a note area operable for storing notes on the search query, and an ad area operable for presenting advertisements.

Further features and advantages of the invention, as well as the structure and operation of various embodiments of the invention, are described in detail below with reference to the accompanying drawings.

BRIEF DESCRIPTION OF THE DRAWINGS

The present disclosure, in accordance with one or more various embodiments, is described in detail with reference to the following figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

FIG. 4 is an illustration of an exemplary query result interface without social assistance.

FIG. 5 is an illustration of an exemplary query result interface with socially augmented search according to an embodiment of the invention.

FIG. 6 is an illustration of a query result interface with socially augmented search with icon friend indicators according to an embodiment of the invention.

DETAILED DESCRIPTION OF THE EXEMPLARY EMBODIMENTS

In the following description of exemplary embodiments, reference is made to the accompanying drawings which form a part hereof, and in which it is shown by way of illustration specific embodiments in which the disclosure may be practiced. It is to be understood that other embodiments may be utilized and structural changes may be made without departing from the scope of the exemplary embodiments of the invention.

The present disclosure is directed toward systems and methods for providing socially augmented search queries. Embodiments of the invention are described herein in the context of one practical application, namely, searching for documents on the internet. Embodiments of the invention, however, are not limited to such applications, and the methods described herein may also be utilized in other applications such as searching for music, image, video, and sound recordings. As would be apparent to one of ordinary skill in the art after reading this description, these are merely examples and the invention is not limited to operating in accordance with these examples.

The usefulness of a search engine depends on the relevance of its search result. While there may be millions of web pages that include a particular word or phrase, some pages may be more relevant than others. Most search engines employ methods to rank results. How a search engine decides which pages are best and in what order results should be shown is a measure of its search accuracy.

Figure 1:
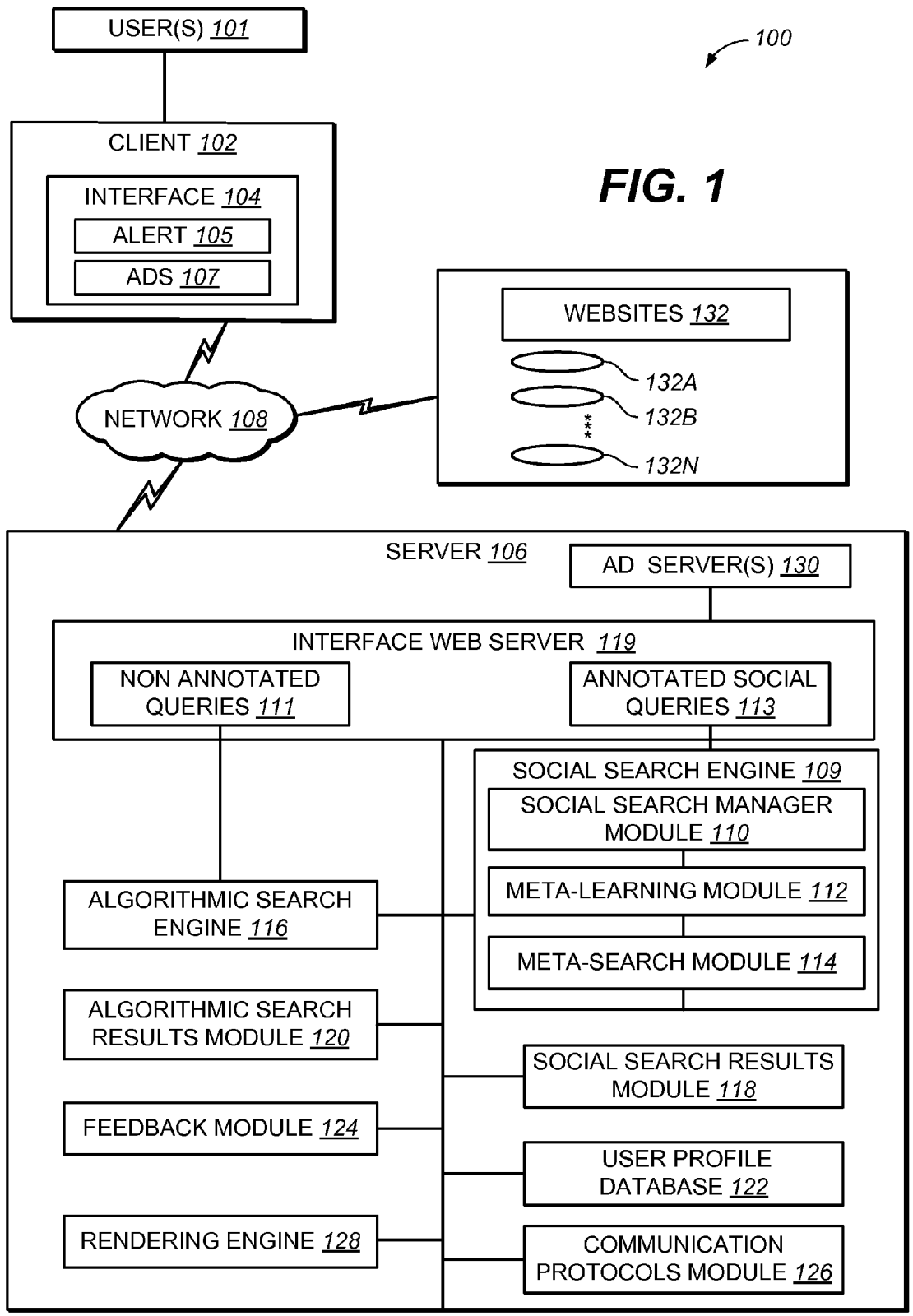
FIG. 1 is a block diagram illustrating an exemplary socially augmented search query system in accordance with an embodiment of the invention.

FIG. 1 is a block diagram illustrating a socially augmented search query system 100 in accordance with some embodiments of the invention. Those skilled in the relevant art will also recognize how to implement the invention using other systems or architectures. Elements of system 100 may represent, for example, a desktop, a laptop or a notebook computer, a hand-held computing device (PDA, cell phone, palmtop, etc.), mainframe, server, client, or any other type of special or general purpose computing device as may be desirable or appropriate for a given application or environment. System 100 comprises a client 102, a server 106, and an interface 104 that may be used to operate the client 102. Generally, the client 102 (or a plurality of clients) may access the server 106 via a network 108.

Client 102 according to some embodiments of the invention may include any one of various types of computer devices, having, e.g., a processing unit, a memory (including a permanent storage device), and a communication interface, as well as other conventional computer components (e.g., input device, such as a keyboard and mouse, and/or output device, such as a display). For example, the client 102 may include a desktop computer, laptop computer, mobile device such as a mobile phone, web-enabled phone, smart phone, and the like.

The client 102 may communicate with the server 106 using suitable communication interfaces via a network 108, such as the Internet. The clients 102 and the server 106 may communicate, in part or in whole, via wireless or hardwired communications, such as Ethernet, IEEE 802.11b wireless, or the like. Additionally, communication between the client 102 and the server 106 may include various servers such as a mail server, mobile server, ad severs, and the like.

The client 102 may comprise interface 104. The interface 104 is operable to accept user input. The user input may be accepted via input devices such as a mouse, keyboard, stylus, touch screen, sound such as voice commands, or via gesture commands such as motions (e.g., shaking), sound waves, light waves, heat waves, and the like. The interface 104 is also operable to change the content and/or the actions of interface components. The interface components may also change content and/or actions at user specified predefined times. The user can access and manipulate the interface 104 as explained in more detail in the context of discussion of FIG. 3. The client 102 may comprise a mobile device, cell phone, PDA, or other devices including various types of displays. The interface 104 may be presented by the server 106 such as, for example, a website server. The interface 104 may also include an always-on alert widget 105 to give an ambient alert of current searches (e.g., on a tickertape) and/or an ads area 107 for displaying advertisements. The interface 104 may be used by a user to utilize and operate the socially augmented search query system 100.

Server 106 according to some embodiments of the invention may include any one of various types of computer devices, having, e.g., a processing unit, a memory (including a permanent storage device), and a communication interface, as well as other conventional computer components (e.g., input device, such as a keyboard and mouse and/or output device, such as a display). The server 106 may be programmed to format data, accessed from local or remote databases or other sources of data, for presentation to users 101 of the client 102, for example, in the formats discussed in detail below. The server 106 may utilize various Web data interface techniques such as the Common Gateway Interface (CGI) protocol and associated applications (or "scripts"), Java™ "servlets", e.g., Java™ applications running on the server 106, or the like to present information and receive input from the client 102. The server 106 may be implemented as, for example, a computer program, and may include a web server (e.g., Apache™) or the like. The server 106, although described herein in the singular, may actually comprise plural computers, programs, devices, backends, and the like, communicating (e.g., wired or wireless) and cooperating to perform the functions described herein.

The server 106 can be a centralized facility, or any or all of its various functions can be distributed across a plurality of facilities or locations in a geographically diverse manner. Further, the various functions described herein as attributable to socially augmented search query can be distributed to and among the various facilities the server 106 services. Various elements of the server 106 may communicate in part or in whole via wireless or hardwired communications link, such as Ethernet, IEEE 802.11b wireless, or the like. Server 106 may include a social search engine 109, which includes a social search manager module 110, a meta-learning module 112, and a meta-search module 114; an algorithmic search engine 116; a social search results module 118; an algorithmic search results module 120; a user profile database 122; a feedback module 124; a communication protocols module 126; a rendering engine 128; and ad servers(s) 130. Generally, the server 106 communicates with websites 132 via communication network 108 such as the internet.

Social search engine 109 offers a method for soliciting more information from users to aid machine query responses, enlisting the power of people's existing social contacts for query answering. While for many people internet query tools like Yahoo! Answers are highly valued for community, individuals, dyads, small and large groups knowledge sharing, there are three issues that remain a barrier to user adoption of a search system for some users: (1) unfamiliarity with the experience as a search interface, (2) discomfort with sharing queries with "strangers", and/or (3) effort of sifting through incomplete, irrelevant or un-trusted content that is returned. Social search engine 109 allows people to share queries with those they already know and trust or whom they know through social networks that potentially exist outside the search or question-asking context. In addition, collaborative search is integrated with personal task and information management by offering simple methods for creating projects, and listing queries by activity categories, setting deadlines for ongoing search needs (i.e., setting up search lists/search queues) and annotation of search sessions.

Social search engine 109 is a form of social search. As noted on wikipedia, "a social search engine is a type of search engine that determines the relevance of search results by considering the interactions or contributions of users". When applied to Web search this user-based approach to relevance is in contrast to established algorithmic or machine-based approaches where relevance is determined by analyzing the text of each document or the link structure of the documents (i.e., the basis of PageRank). However, embodiments of this invention go further than this notion of social search. Social search engine 109 assumes that a searcher doesn't just ask other people questions but he/she involves others in the ongoing activity of search—one doesn't just say "I don't know this," but rather bundles up his/her known information and circulates the information to others ("this is what I have found so far"), and that becomes the conversation object for "machine-assisted social search." Embodiments of the invention allow different social groups (e.g., partitioned friend lists or aggregated friend lists) to see queries and answer them. This may result in people getting more involved in asking and responding to queries so they will spend more time using the service provider. Further, queries are solved socially and collectively, not algorithmically and post-hoc on old aggregate data—but on live socially interpreted content.

The social search manager module 110 included in the social search engine 109 makes machine-search and social-search an artifact-laden persistent conversation. The artifacts are search queries and results and notes on their merits, combined with new queries and results generated by the conversation. The artifacts can be packaged for future recommendation. Social interpretations of queries by local sub-groups can allow limited local disambiguation of terms based on repeat usage within the discourse sub-group. For example, the query "Genesis" results in a top result being a CD recommendation, based in part on a conversational thread that also includes the word "Foxtrot," as opposed to resulting in biblical reference results.

Social search manager module 110 marshals and combines the power of people's collective social network knowledge with search engine results generated from broader aggregate models of relevance to answer people's queries. Capturing the interaction between the friends (aka the members of the social network) in response to queries and by providing personal information and task management tools integrated into the search experience can elicit socially and personally relevant meta-data for developing improved decentralized user models. Through user modeling, users' queries can be interpreted at a more personal level and search results improved in terms of the relevance to the user tasks.

Social search manager module 110 introduces the concept of search queues—items for which an answer is not needed immediately, and where the user is willing to wait for a response from friends (one of whom is the search engine itself). While these are common in social recommendation sites and in the form of to-do and task list applications in personal information management, these are often not well combined with standard search engine sites. Embodiments of the invention present means by which to generate more user-entered query disambiguation content. The user-entered query disambiguation content enables the development of (machine) user models that are grounded in localized individual and social activity. These user models contrast with purely aggregate activity where nuances and local differences are lost. The method, according to embodiments of the invention, therefore offers a means to combine local and general user models in disambiguating user queries and in predicting the user-specific value of search query results. Search queues also "buy time" for results that cannot perhaps be computed in a time frame that does not frustrate the user, and where a broader model of human-system collaboration can be maintained—for slow-response queries as well as fast-response queries.

Meta-learning module 112 collects meta-data by analyzing social search results to simulate the social search in an algorithm. The machine learning may comprise user-in-social-group and social-group predictive models to improve relevance of query results. That is, the meta-data can give the user a mechanism to collect his recent queries and results under a single project, task, or topic to help clarify user-intent. The current Machined-Learned Ranking (MLR) algorithms have not been trained to deal with such a rich set of user-input. For example, algorithm according to the embodiment of this invention may include data structures that make up personal and social/collaborative search system architectural components. These may include: a user personal information store (e.g., user profile database 122) with ID information and conversational search persistent databases (e.g., the database that keeps all the bundled meta-data, and queries and results, and social search activity data like the conversations, ratings, notes and conclusion that happen during the social search (as performed by meta-search module 114)).

Meta-search module 114 is operable to monitor searches by search friends, and use artificial intelligence or other techniques to deduce improved search algorithms for algorithmic search engine 116. A search friend may comprise, without limitation, a person who is requested by a user, and also a person or people having metadata that the system uses to determine an appropriate "friend" to help you with your searches. For example, if a person in a user's social graph has expressed knowledge in wine and the user searches for wine, then the system may suggest that the person helps for searching the wine for the user. A search friend may also comprise explicit known/trusted sources which the user already has a relationship with and invites into the system, and system recommended sources with scaffolding/support for making the social connection as a way to point people to internet experts or "guides". The meta-search module 114 operates on one or more computers, servers, workstations, or other data gathering, processing, computing and reporting systems. The meta-search module 114 may also include data storage, record keeping and retrieval capabilities. The meta-search module 114 can include one or more databases to store the various data and other information used. Data storage can be across any physical or logical data storage architecture, and any of a number of database models can be implemented.

The algorithmic search engine 116 is an information retrieval system for finding information stored on internet web servers using algorithmic search programs. Search engines provide an interface to web search tools that enable users to specify a search query about an item of interest and have the engine find any matching items. The search query is typically expressed as a set of words that identify the desired concept that one or more documents may contain. Most search engines support the use of Boolean operators to further specify the search query. A search engine operates by searching a large number of web pages, which they retrieve from the internet. These pages are retrieved by a Web crawler or internet spider. The contents of each page are then analyzed to determine how it should be listed. The list of items that meet the criteria specified by the query is typically sorted to place the most relevant items first. When a user enters a query into a search engine (e.g., typically by using key words), the search engine provides a listing of best-matching web pages in order according to its criteria. Also, for example, a user enters a query looking for words that are in common on web pages that are returned and are not part of the original query, e.g., 'Blahnik' and 'patent' are entered into a query, but the top five pages returned also have a high incidence of the words shoes and designer, so the user is asked if they want to see shoes from other designers.

The user profile database 122 provides an extension/redesign of the underlying statistical user modeling methods and machine learning strategy. The user profile with the users preferences include the social graph such as a list of people with their known or declared interests or area of expertise such as people followed on micro-blogs. The user profile may also comprise their search history such as specific keywords (e.g., Maui Resorts) and/or a project name that is made up of a series of keyword searches (e.g. Project: Hawaii Trip—Keywords comprising project: Maui Resorts, Maui Helicopter Rides, Flight to Maui from San Francisco) plus their registered devices such as a mobile device for searching and for receiving alerts 105 on the interface 104. For example, a user signs up for the friendly search using his/her Yahoo ID, and by filling out the profile as explained below. He can then register her/his device to which he would like to receive alerts of what his friends are searching for, and where he would like recommendations to be sent. The friends may consist of individuals, or groups of people such as a bike team, and the like. The profile is always editable via the user interface 104 so the user can update it at any time.

Feedback module 124 is operable to provide feedback to the friends based on the comments received from other friends. The feedback may be, without limitation, conversational (e.g., direct opinion), an explicit rate (thumbs up/down), or a click on the shared link. Feedback may comprise any reaction or action the recipient has. Human searching and recommending of these media forms may be more reliable since indexing may be problematic and tagging has been demonstrated to be only moderately reliable. Selection and presentation as part of a conversation may be a more relevant recommendation. And as part of the system, if the user rejects the recommendation, the recommender may be privy to the reasons why they are explained to the recommender.

Communication protocols module 126 utilizes email, phone numbers, IM address and the like to contact the friends as explained below in the context of discussion of FIG. 8.

Rendering engine 128 collates information from the above sources 110/112/114/116/118/120/122/124/126, and presents them on the interface 104 of the client 102 on a user's device. Data flows to the client 102 on a user's device and from the client 102 on a user's device via the network 108. For example, search queries 111/113 from the client 102 on a user's device tells the system 100 the item that the user is interested in. The rendering engine 128 collates the data from the social search results module 118 and the algorithmic search results module 120 and presents them to the user on interface 104 of client 102 in a search results interface as explained below in the context of discussion of FIG. 8. The rendering engine algorithms use the search queries 111/113, the friend's recommendations from the social search manager module 110, and the user profile from the user profile database 122 in the form of filters to present only the currently relevant information in combination with the user's search queries 111/113 and friend's recommendations.

Ad servers 130 provide advertising related to the search queries 111/113. For example, the user may receive contextual advertisements from the ad servers 130 such as ads for a nearby store, a particular event, a hotel, tickets for various events, and the like. The contextual advertisement may be presented on the interface in ad areas such as the ads area 107.

Websites 132 and websites 132A-132N (where N represents a total number of websites) are provided by various World Wide Web servers or other servers that contain information available for search. The websites 132 may operate on various computing devices throughout the world. For example, yahoo.com is a popular website operated at various web server sites around the world, baidu.com is a popular search engine located in China, and united.com is an airline website that is used in many countries.

Figure 2:
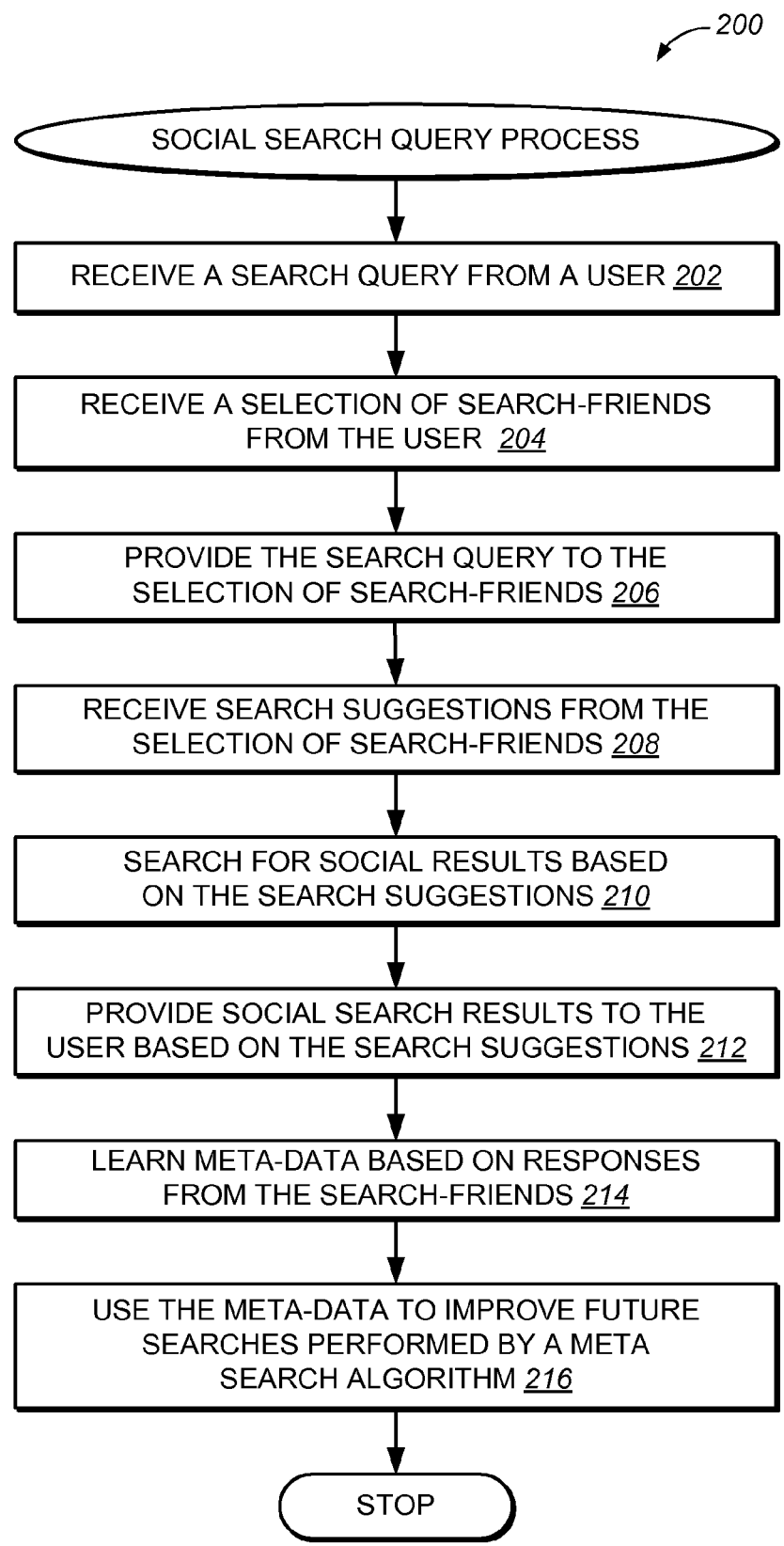
FIG. 2 is an illustration of an exemplary social search process according to an embodiment of the invention.

FIG. 2 is an illustration of an exemplary social search query process 200 that may be performed by system 100 according to an embodiment of the invention. The various tasks performed in connection with process 200 may be performed by software, hardware, firmware, a computer-readable medium having computer executable instructions for performing the process method, or any combination thereof. It should be appreciated that process 200 may include any number of additional or alternative tasks, the tasks shown in FIG. 2 need not be performed in the illustrated order, and process 200 may be incorporated into a more comprehensive procedure or process having additional functionality not described in detail herein. For illustrative purposes, the following description of process 200 may refer to elements mentioned above in connection with FIG. 1. In various embodiments, portions of process 200 may be performed by different elements of system 100 (e.g., client, server, and the interface).

Social search process 200 may begin by a user looking for an item of information. The user can then enter the various parameters of the search. The user may type in a query into the interface 104 of system 100. Process 200 receives the search query from a user (task 202). The query is sent to both the meta-search module 114 and an algorithmic search engine 116. The search query may be, without limitation, a Boolean expression of search keywords. Process 200 then receives a selection of search friends from the user (task 204). In one embodiment, the user can choose among a list of friends (e.g., individuals or a group of people). The decisions and choices of the friends implicit in their search recommendations are inferred and used to update a local social user model. As will be discussed in more detail below in the context of discussion of FIGS. 3-6, a new user interface is used to input the search query that supports novel interactions between people, between people and their content, and between people and search engines.

Process 200 may then provide the search query to the selection of search friends (task 206), and receives search suggestion(s) from the selection of search friends (task 208) (via the social search manager module 110) to form user annotated social search queries which is used to perform a social search based on each user's social and personal comments as will be explain in more detail below. The query is sent to both the social search engine 109 and an algorithmic search engine 116 augmented with a social search model. Search has commonly been divided into three types: navigational, informational and transactional. Usually these are assumed to be increasingly complex, where a single search query is less likely to satisfy a transactional search engagement than it is a navigational one. The search model used for socially augmented search query process 200 allows users to choose the level of time, effort and social engagement they wish to invite in solving any search query. Usage examples are described below, focusing on more or less complex search needs.

The standard algorithmic search is performed based on the search queries (task 210). As explained above, the search based on non-annotated queries 111 may be performed by an algorithmic search module 116 such as a local algorithm, or sourced from an external algorithm such as from an internet search site. The suggestions of friends may be used to form user annotated social search queries and used to perform a social search based on each user's social and personal comments using the meta search module 114.

The results of the social search and the standard search are then presented on the interface 104 to the user (task 212) and analyzed to refine the user profile database 122 to provide an extension/redesign of the underlying statistical user modeling methods and machine learning strategy. The user may select items from the search results (from search results module 118/120) accordingly.

Process 200 then learns the meta-data using the meta-learning module 112 based on the responses from the search friends task (214). For example, meta-data may be collected by analyzing the social search results (from social search results module 118) to simulate the social search in an algorithm via machine learning. The machine learning may comprise user-in-social-group and social-group predictive models to improve relevance of query results. That is, the meta-data can give the user a mechanism to collect his recent queries and results under a single project task, or topic in user profile database 122 to help clarify user intent.

The meta-data is then used to improve future social searches performed by a meta-search algorithm using the meta-search module 114 and the algorithmic search engine 116 as explained above (task 216). For example, Jenny is traveling to London, and has been looking up flights that will suit her. She enters "London" and "cheap flights" to the Friendly Search. Over a year ago she entered the same query into Friendly Search, and received recommendations from her friends. Given its proximity to Brighton, where she usually travels, her friends had strongly recommended Gatwick airport. The metadata from those prior queries is used by the search engine to prioritize flights that are flying into Gatwick, not Heathrow, even before she receives any input from friends. The search engine infers her preference on the basis of the past search and recommendations from her friends—the search engine learned based on her trusted sources and her actions what works for her. The results that are prioritized in this way are clearly indicated.

In this manner social search query process 200 provides easily manageable personal query logs that can be aggregated into "projects" or "topics." The use of meta-data results in a broader notion of query setting or formation of a query. The broader notion of a query includes query posting to friend networks (groups or networks of friends) or individuals. By posting queries to friend networks or individuals, collaboration can be made by using social-network solutions in combination with machines. Meta-data can also be added for query disambiguation. Queries may be posted with deadlines to facilitate results with deeper human and machine processing (more like collaboration). Awareness of others' queries allows ongoing micro-collaboration possibilities and enhances social collaboration as well as leveraging and fostering friendships. Provision of better options for short, medium and long term search and information finding needs (into information provision, task support and mission collaboration). Meta-data may be accumulated for better disambiguation of search queries. Accumulation of linguistic parsing by people in social networks allows for development of group discourse semantics for better disambiguation of search queries. Storage of search activities in social and personal context as part of creating the user profile database 122 enables bounded and tractable model development through machine learning techniques and statistical modeling.

Figure 3:
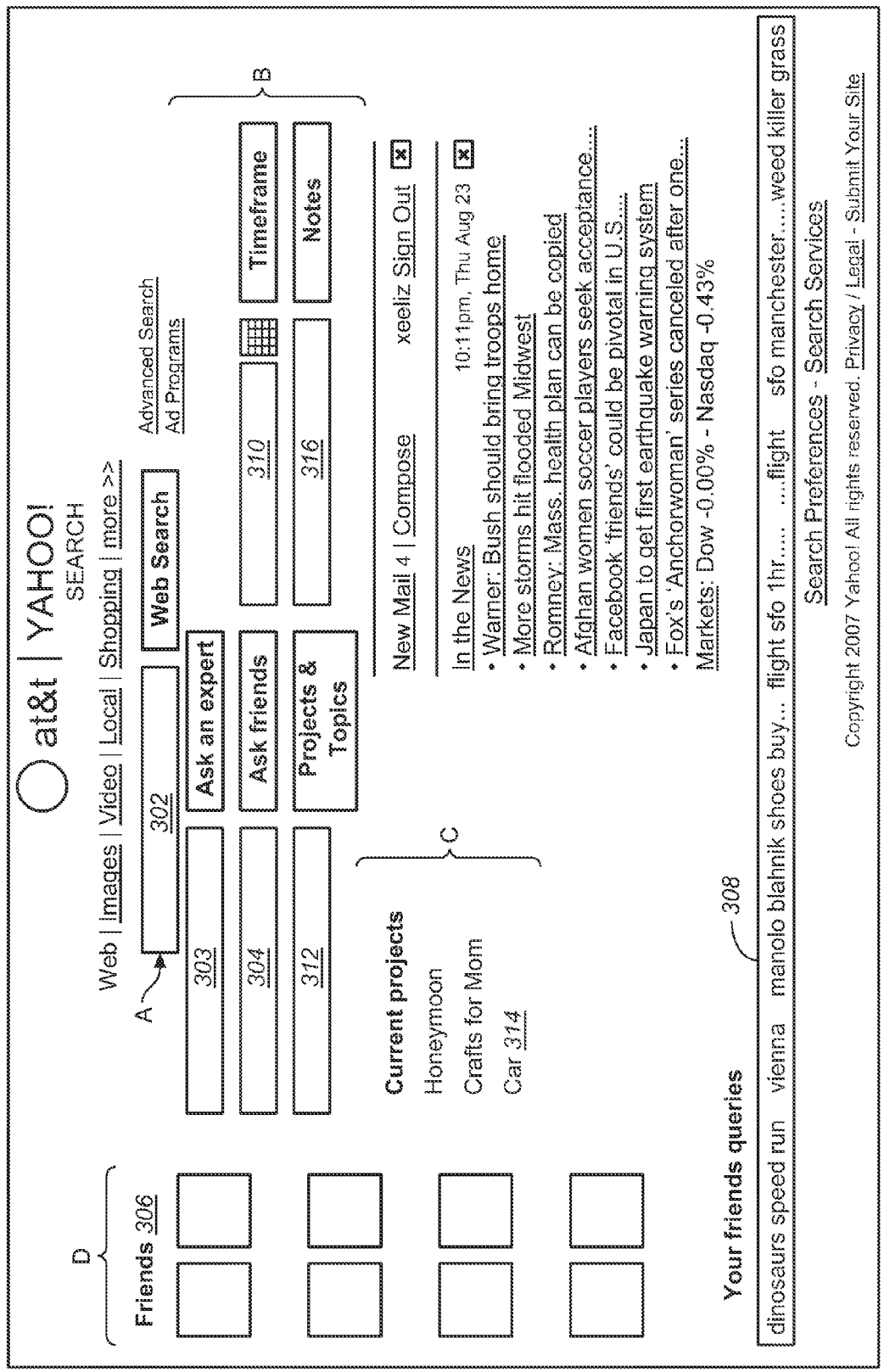
FIG. 3 is an illustration of an exemplary social search query interface according to an embodiment of the invention.

FIG. 3 is an illustration of an exemplary social search query interface according to an embodiment of the invention. FIG. 3 shows a social search query interface 300 as it might appear on a display of the client 102 according to an embodiment of the invention. The social search query interface 300 and interaction experience folds social search into a familiar search experience, and extends search into a social experience. The social search query interface 300 may include a standard search field 302, an "ask friends" box 304, "ask an expert" button 303, a set of friends icons 306, ticker notification feature 308, timeframe/deadline box 310, a projects box 312, a projects list 314, and a notes box 316.

The social search query interface 300 utilizes the addition of context "dialogue boxes" and friends to search in addition to the standard search field 302. These features are bundled as optional choices, so users can retain the simple search option provided by standard search field 302 if they wish to do so. The additional components, which provide additional, search features and which are intended to be purely optional, are discussed in the following.

The "ask friends" box 304 is an update field into which a user can either select friends from the set of friends icons 306 by clicking on each of the friend icons 306 to add individuals by their name, or by entering group names if friends are organized into groups (e.g., swimming teams). Entering any of these will result in the query being logged and optionally being sent to identified friends (e.g., upon user's consent) by email, listed in a "My Searches" web page with content presented using friend invitations as access control, and insertion into an awareness ticker notification feature 308. The "ask an expert" button 303 may be used to find answers from experts. These experts could be explicitly registered as content guides or could be inferred from their other activities.

The timeframe/deadline box 310 is an update field into which users can enter a deadline by which the information is deemed useful. This feature is useful for friends, as the date by which the system removes the query from the collaborative query log page, and for the service provider as this adds potential for delivery of search results over time, enabling the potential for better and more nuanced query results.

The projects box 312 is an update field in which users can allocate any query to an ongoing "project", "task" or "mission". The projects are listed in the projects list 314.

The notes box 316 is an update field where additional comments in free form text can be added to (1) give friends who may not already have context some background and (2) as an annotation for queries that are part of "projects", tasks or "missions". Embodiments of the invention offer potential for semantic disambiguation should query parsing be necessary for better search query results. The user may receive better search query results by using the socially augmented search as shown in FIG. 4 below.

FIG. 4 is an illustration of an exemplary query result interface without social assistance 400. In a scenario of planning a conference and vacation trip, having booked her flights, Elizabeth is starting to plan her trip to the UK which will include a few days of vacation. She decides she wants to rent a cottage in the countryside in Northumberland so she enters this as a search query, typing "cottage rent Northumberland". She gets the query results 402, as shown in FIG. 4. The query results 404 for "Nearest airport Lancaster UK" do not satisfy the query. By adding friends' suggestions or comments (harnessing their natural language and intent interpretation skills), and by processing those, the results could be more relevant as shown below.

FIG. 5 is an illustration of an exemplary query result interface with socially augmented search 500 according to an embodiment of the invention. The query results 502 for "cottage rent Northumberland" are relevant as this is a linguistically easier construction. The social aspect here adds the possibility for additional recommendations, and also could result in more people seeking services (e.g., invitation and awareness). People invited to use the service are more likely to use the same service provider since the shared project/topic history exists only with the service provider. The user adds the query to her Conferences project, and creates a new Project "Vacations" which she also adds this query to—in both cases this is done by typing the words Conference and Vacations into the projects box 312. When a new word is entered into the project box 312, the user is asked if they want to start a new project. She also adds the names of two specific people from her list of friends indicated the set of friends icons 306 via "ask friends" box 304, to send them an alert that she has made this query. She adds the notes in the notes box 316 that the query is because she intends to vacation and do they want to come—she types "Possible vacation idea, want to join". Her selected search friends get a notification of her query with the context of the query from her notes entered in the notes box 316. They respond by selecting the items from the query results page 502 that they would like Elizabeth to consider. In addition to the explicit invitation that she sends her friends, her query is sent out in her ticker notification feature 308 to all her friends. Beki sees the query and asks Elizabeth if she could send her some information on Northumbrian Pipes for her most recent project—she tells Elizabeth of the museum that has a particularly good collection that she may wish to visit.

FIG. 6 is an illustration of a query result webpage with socially augmented search with icon friend indicators 600 according to an embodiment of the invention. A search for hotels in Vienna, Austria gives results 602 with the addition of icons 604 that indicate the friends who also recommend the website for information.

Figure 7:
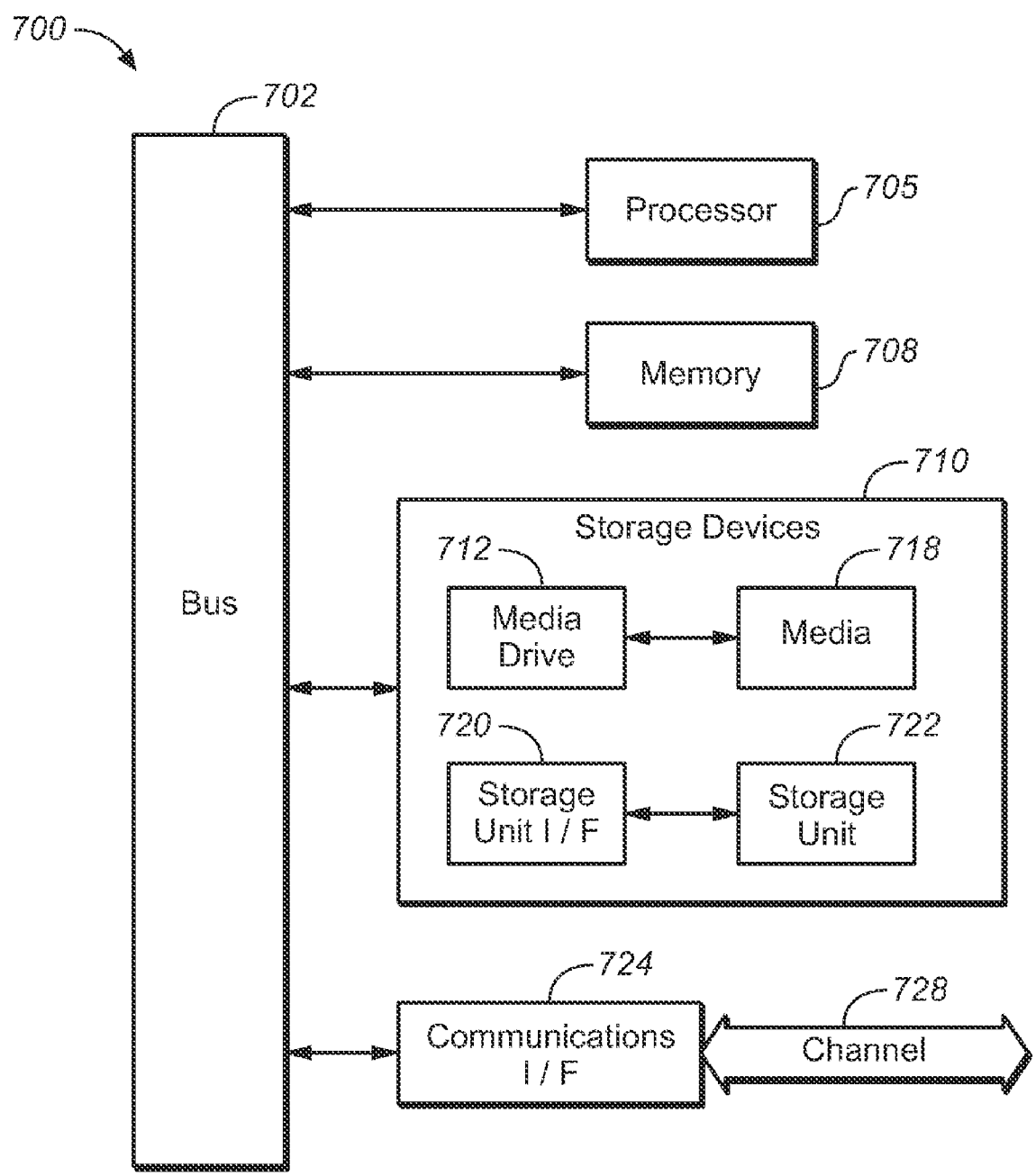
FIG. 7 is a block diagram illustrating an exemplary computer system that may be used in accordance with some embodiments of the invention.

FIG. 7 illustrates a typical computing system 700 that may be employed to implement processing functionality in embodiments of the invention. For example, computing systems 700 of this type may be used in clients and servers. Those skilled in the relevant art will also recognize how to implement the invention using other computer systems or architectures. Computing system 700 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 700 can include one or more processors, such as a processor 704. Processor 704 can be implemented using a general or special purpose processing engine such as, for example, a microprocessor, microcontroller or other control logic. In this example, processor 704 is connected to a bus 702 or other communication medium.

Computing system 700 can also include a main memory 708, such as random access memory (RAM) or other dynamic memory, for storing information and instructions to be executed by processor 704. Main memory 708 also may be used for storing temporary variables or other intermediate information during execution of instructions to be executed by processor 704. Computing system 700 may likewise include a read only memory ("ROM") or other static storage device coupled to bus 702 for storing static information and instructions for processor 704.

The computing system 700 may also include information storage system 710, which may include, for example, a media drive 712 and a removable storage interface 720. The media drive 712 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 718 may include, for example, a hard disk, floppy disk, magnetic tape, optical disk, CD or DVD, or other fixed or removable medium that is read by and written to by media drive 712. As these examples illustrate, the storage media 718 may include a computer-readable storage medium having stored therein particular computer software or data.

In alternative embodiments, information storage devices 710 may include other similar components for allowing computer programs or other instructions or data to be loaded into computing system 700. Such components may include, for example, a removable storage unit 722 and a storage unit interface 720, such as a program cartridge and cartridge interface, a removable memory (for example, a flash memory or other removable memory module) and memory slot, and other removable storage units 722 and interfaces 720 that allow software and data to be transferred from the removable storage unit 718 to computing system 700.

Computing system 700 can also include a communications interface 724. Communications interface 724 can be used to allow software and data to be transferred between computing system 700 and external devices. Examples of communications interface 724 can include a modem, a network interface (such as an Ethernet or other NIC card), a communications port (such as for example, a USB port), a PCMCIA slot and card, etc. Software and data transferred via communications interface 724 are in the form of signals which can be electronic, electromagnetic, optical, or other signals capable of being received by communications interface 724. These signals are provided to communications interface 724 via a channel 728. This channel 728 may carry signals and may be implemented using a wireless medium, wire or cable, fiber optics, or other communications medium. Some examples of a channel include a phone line, a cellular phone link, an RF link, a network interface, a local or wide area network, and other communications channels 728 to perform features or functions of embodiments of the invention. Note that the code may directly cause the processor to perform specified operations, be compiled to do so, and/or be combined with other software, hardware, and/or firmware elements (e.g., libraries for performing standard functions) to do so.

Figure 8:
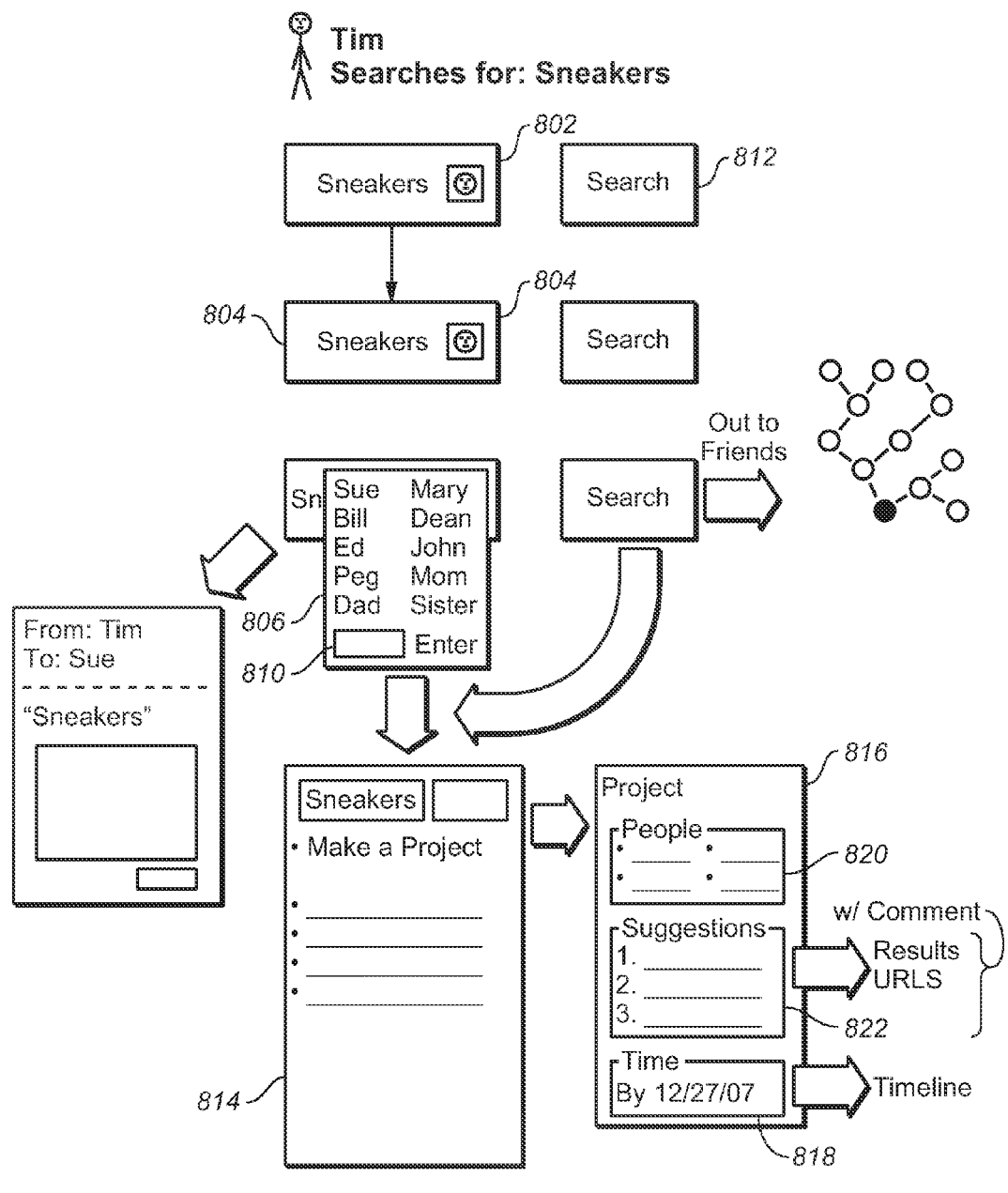
FIG. 8 is a diagram illustrating an exemplary social search interface environment according to an embodiment of the invention.

FIG. 8 is a diagram illustrating an exemplary social search interface environment 800 according to an embodiment of the invention. The social search interface environment 800 may include: a friendly search button 802, a search area 804 (same as 302 in FIG. 3), a friends' list dialog box 806, an enter name area 810 (same as 304 in FIG. 3), a search button 812, a project area 814 (same as 312 in FIG. 3), a project page 816, a time line area 818 (same as 310 in FIG. 3), other friends area 820 (same as 306 in FIG. 3), and a results page 822. Following are examples of how a friendly search may be conducted by a user in connection to FIGS. 1, 3, and 8.

As a first example, Elizabeth is looking for the Human Computer Interaction 2007 conference website. She does not know the exact Internet address (URL) so she types what she knows into the query box: "Human Computer Interaction 2007 conference". Knowing she may want to look this up again later and there may be related pages, she creates a "project" called "Conferences" and types this into the project box 312. She does not have a possible deferred deadline for this search query, she'd prefer the answer now so she leaves the timeframe/deadline box 310 empty. She also does not ask any of her friends. Her query is added to her personal projects list 314. The Yahoo search engine searches for the requested information and offers her a list of possible results. When she clicks on or activates the appropriate result in the project area 814, the resulting web URL is added to her project list 314 associated with the query string she entered into the standard search field 302. In future she can check her projects list 314 to find the web URL again, and also the search engine can check to find similar URLs in future if she forgets she has already done this query, and present her with a highly ranked result more quickly. Her query is sent via the ticker notification feature 308 to her friends via "ask friends" box 304 and indicated by the set of friends icons 306 who see she has been querying regarding the conference. Jeff sees this on his mobile friend search alert 105 and phones Elizabeth to ask if she is planning on going, and that he may well be traveling also.

As a second example, Elizabeth is planning her trip to the Human Computer Interaction conference in Lancaster. She needs to book flights and is searching for the nearest airport that would be convenient for getting to Lancaster. Knowing she has already created a project about the conference she locates the URL to check the dates for the conference. She finds the dates and sees the conference is in Lancaster in the UK (for example, in standard search field 302). She does not know which would be the best airport given distance, public transport and time of year, so she enters a search query in the standard search field 302 "Nearest airport Lancaster UK". She adds Conferences to the projects box 312 so that this query is added to her personal projects list 314. She also adds in the notes box 316 "Looking for the most convenient airport to get to Lancaster next week" and selects four people from her friends list using the set of friends icon 306 that she knows are familiar with the area and/or may be going to the conference. Her query is added to the social query ticker notification feature 308 which she always keeps activated so her friends can see what she is searching. She enters a deadline of Aug. 15, 2007 (e.g., in timeframe/deadline box 310) as she has to have the flight booked and organized by then. She sends off the query and gets the following result immediately from the search engines 109/116. However, from her friends she gets some detailed responses explaining issues that are currently local news—she discovers that Manchester airport is the closest but currently under development and there are delays getting checked in and getting through security, but that work has ceased at Heathrow and she can easily get a train or short flight to Manchester or to Lancaster itself. Also, knowing she is currently with United Mileage Plus, her friend Joe tells her about a special upgrade deal he just benefited from she may want to enquire about. Her friends have left all these details on the social scratchpad of her Conferences Project associated with the initial query that was posed. Reviewing some of these comments associated with the initial search query, the Yahoo algorithmic search engine 116 augmented by the social search engine 109 offers Elizabeth a list of sponsored links including United Airlines, Virgin Rail and local hotels in Manchester, Lancaster and near Heathrow.

As a third example, Tim starts interacting using Friendly Search. When Tim sees a link on the Yahoo Home page he signs up for the service using his Yahoo ID. Tim signs up for the service by filling out a profile where he registers devices to which he would like alerts of what his friends are searching for, and where he would like recommendations sent. He also fills out his friend's list in ask friends box 304, inviting other people to join, and ranks friends he would like to "follow" closely in terms of what they are searching. He also specifies his interests and events, items, etc. he is particularly interested in to create a profile. The profile is always editable so he can update it at any time. He can also start new projects using the projects box 312, set deadlines using timeframe/deadline box 310 for project searches he is interested in that may be time limited, etc. Once he has set up his friendly search profile he activates the friendly search button (e.g., a face icon 802). The service also gives people the option to have an always-on widget 105 on their device interface 104 to receive a notification on a tickertape (such as a ticker notification feature 308) of current searches from friends. Tim searches for the word "sneakers". When he activates/clicks on the face icon 802, a friend's list dialog box 806 appears with a list of his friends. He can also add new people in enter name area 810 who may know about sneakers who are not already listed in his friend's list dialog box 806. For example, he enters an email, a phone number, IM address or some other "handle" for the friend (e.g., Twitter, etc.) in the enter name area 810. Once he hits or activates the search button 812, the search request goes to the selected people from his social group and to the people he has identified separately who are not already on friendly search (they will receive an alert/notification with the request and an invite to join Friendly Search, which is one way the service advertises itself). Tim is asked if he would like to create a project in the project area 814 of the current search "sneakers." Tim fills out more information about the "sneakers" request in the project page 816. This project page 816 is part of his portfolio of searches, search histories, projects and so on. Tim can add additional keywords, can add a timeline in the time line area 818, and can specify other friends in the other friends area 820 from this site. The search query is then sent to his selected friends 806/810 via the social search manager module 110, also to the algorithmic search engine 116 and the meta-search module 114. The results from result modules 120/118 are collated into the results page 822.

Tim can peruse the search results 822 at his leisure—recommendations from friends and also future recommendations from Yahoo will continue to populate this page until the deadline of interest has hit or until Tim manually chooses to close the search.

Embodiments of this invention are distinct in there combination of standard machine-derived query results and socially recommended query results. Further this proposed application offers a search activity awareness notification feature (similar to features in social sites like YouTube that allow users to view what other users are currently viewing). Additionally, embodiments of the invention offer a developing model of the individual user by logging the individual's queries, who they ask, the details they offer to disambiguate the query for friends, deadlines for responses and potential for combining searches conducted over several days into "projects". The ability to store queries for later responses, while a feature of social sites like Answers, does not tend to be offered by search engines, whose focus is on delivering immediate query-response needs. Embodiments of this invention merge Answers from search and integrating group dialogue that can be opened up to a wider audience, rather than starting from general queries and refining to smaller interest groups. Other social recommendation sites (e.g., Netflix, Amazon, LastFM) do not offer search features that push queries to friends and to the search engine. Social recommendations are based on aggregate data from users with similar purchase profiles. Current Search Histories are also in this space, allowing people to collect their searches over time over various media. However, these remain individual and personal experiences, and are not used to enhance current searches—they are logs, not resources for socially grounded user intent modeling.

Although embodiments of the invention are described herein in terms of social search, it should be understood that the present disclosure is not limited to social search, but is generally applicable to community communication. Furthermore, although the present disclosure has been fully described in connection with embodiments thereof with reference to the accompanying drawings, it is to be noted that various changes and modifications will become apparent to those skilled in the art. Such changes and modifications are to be understood as being included within the scope of the present disclosure as defined by the appended claims.

While various embodiments of the invention have been described above, it should be understood that they have been presented by way of example only, and not of limitation. Likewise, the various diagrams may depict an example architectural or other configuration for the disclosure, which is done to aid in understanding the features and functionality that can be included in the disclosure. The disclosure is not restricted to the illustrated example architectures or configurations, but can be implemented using a variety of alternative architectures and configurations. Additionally, although the disclosure is described above in terms of various exemplary embodiments and implementations, it should be understood that the various features and functionality described in one or more of the individual embodiments are not limited in their applicability to the particular embodiment with which they are described, but instead can be applied, alone or in some combination, to one or more of the other embodiments of the disclosure, whether or not such embodiments are described and whether or not such features are presented as being a part of a described embodiment. Thus the breadth and scope of the present disclosure should not be limited by any of the above-described exemplary embodiments.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skilled in the art, two or more modules may be combined to form a single module that performs the associated functions according embodiments of the invention.

In this document, the terms "computer program product", "computer-readable medium", and the like may be used generally to refer to media such as, for example, memory, storage devices, or storage unit and database. These and other forms of computer-readable media may be involved in storing one or more instructions for use by processor to cause the processor to perform specified operations. Such instructions, generally referred to as "computer program code" (which may be grouped in the form of computer programs or other groupings), when executed, enable the computing system.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all operable in a common package. Indeed, any or all of the various components of a module, whether control logic or other components, can be combined in a single package or separately maintained and can further be distributed across multiple locations.

Additionally, memory or other storage, as well as communication components, may be employed in embodiments of the invention. It will be appreciated that, for clarity purposes, the above description has described embodiments of the invention with reference to different functional units and processors. However, it will be apparent that any suitable distribution of functionality between different functional units, processing logic elements or domains may be used without detracting from the invention. For example, functionality illustrated to be performed by separate processing logic elements or controllers may be performed by the same processing logic element or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processing logic element. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A system comprising:
   a processor;
   a storage medium for tangibly storing thereon program logic for execution by the processor, the program logic comprising:
   search query receiving logic executed by the processor for receiving a search query from a user;
   search subject receiving logic executed by the processor for receiving a search subject and a timeline from the user;
   friend list selection receiving logic executed by the processor for receiving a selection of a search friend from a friend list associated with the user;
   search query communication logic executed by the processor for communicating information of the search query, the search subject and the timeline to the search friend;
   recommendation receiving logic executed by the processor for receiving a search recommendation response from the search friend;
   meta-learning logic executed by the processor for learning meta-data based on the search recommendation response from the search friend, the meta-learning logic using the meta-data to improve future searches performed by a meta-search algorithm;
   internet search logic executed by the processor for performing an internet search based on the search recommendation response to create a search result; and
   search result providing logic executed by the processor for providing the search result to the user.

2. The system of claim 1, wherein the search friend comprises a group of friends.

3. A method comprising:
   receiving, by a computing device, a search query from a user;
   receiving, by the computing device, a search subject and a timeline from the user;
   receiving, by the computing device, a selection of a search friend from the user;
   providing, by the computing device, the search query, the search subject and the timeline to the selected search friend;
   receiving, by the computing device, a search recommendation response from the selected search friend;
   learning, by the computing device, meta-data based on the search recommendation response from the search friend, the meta-data being used to improve future searches performed by a meta-search algorithm;
   performing, by the computing device, an internet search based on the search recommendation response to create a search result; and
   providing, by the computing device, the search result to the user.

4. The method of claim 3, further comprising:
   modifying, using the computing device, a search algorithm based on the search response.

5. The method of claim 3, further comprising:
   using, by the computing device, the search algorithm for a search.

6. The method of claim 3, further comprising:
   sending, by the computing device, a feedback from the user to the search friend.

7. The method of claim 3, further comprising:
   providing, by the computing device, advertising related to the search query.

8. A non-transitory computer-readable storage medium for tangibly storing thereon computer readable instructions for a method comprising:
   receiving a search query from a user;
   receiving a search subject and a timeline from the user;
   receiving a selection of a search friend from the user;
   providing the search query, the search subject and the timeline to the selected of the search friend;
   receiving a search recommendation response from the selected search friend;
   learning meta-data based on the search recommendation response from the search friend, the meta-data being used to improve future searches performed by a meta-search algorithm;
   performing an internet search based on the search recommendation response to create a search result;
   providing the search result to the user.

9. The non-transitory computer-readable storage medium of claim 8, further comprising:
   modifying a search algorithm based on the search recommendation.

10. The non-transitory computer-readable storage medium of claim 9, further comprising:
    using the search algorithm for a search.

11. The non-transitory computer-readable storage medium of claim 8, further comprising:
    learning meta-data based on the recommendation from the search friend.

12. The non-transitory computer-readable storage medium of claim 8, further comprising: sending a feedback response from the user to the search friend.

13. The non-transitory computer-readable storage medium of claim 8, further comprising: providing advertising to the user related to the search query.

* * * * *